United States Patent
Aleksic et al.

(10) Patent No.: US 7,873,467 B2
(45) Date of Patent: Jan. 18, 2011

(54) SENSOR DEVICE FOR A MOTOR VEHICLE SYSTEM

(75) Inventors: Mario Aleksic, Trossingen (DE); Alexander Bracht, Esslingen (DE); Volker Entenmann, Affalterbach (DE); Jochen Linkohr, Korb (DE); Klaus Mezger, Stuttgart (DE); Roland Ortloff, Waiblingen (DE); Robert Schuessler, Stuttgart (DE)

(73) Assignee: Daimler AG, Stuttgart (DE)

( * ) Notice: Subject to any disclaimer, the term of this patent is extended or adjusted under 35 U.S.C. 154(b) by 1335 days.

(21) Appl. No.: 10/528,789

(22) PCT Filed: Sep. 2, 2003

(86) PCT No.: PCT/EP03/09721

§ 371 (c)(1),
(2), (4) Date: Sep. 7, 2005

(87) PCT Pub. No.: WO2004/029552

PCT Pub. Date: Apr. 8, 2004

(65) Prior Publication Data

US 2006/0100780 A1    May 11, 2006

(30) Foreign Application Priority Data

Sep. 23, 2002  (DE) ................................ 102 44 329

(51) Int. Cl.
*G01C 21/30* (2006.01)
(52) U.S. Cl. ........................................ 701/208; 701/45
(58) Field of Classification Search .................. 701/45, 701/208
See application file for complete search history.

(56) References Cited

U.S. PATENT DOCUMENTS

| 5,694,322 | A | 12/1997 | Westerlage et al. |
|---|---|---|---|
| 7,353,108 | B2 * | 4/2008 | Adachi ...................... 701/208 |
| 2001/0018628 | A1 * | 8/2001 | Jenkins et al. ................. 701/35 |
| 2001/0027375 | A1 | 10/2001 | Machida et al. |
| 2002/0035432 | A1 | 3/2002 | Kubica et al. |
| 2002/0059026 | A1 * | 5/2002 | Abe et al. .................... 701/301 |
| 2005/0159887 | A1 * | 7/2005 | Machii et al. ............... 701/208 |
| 2007/0118280 | A1 * | 5/2007 | Uhlmann et al. ............ 701/208 |
| 2008/0059063 | A1 * | 3/2008 | Kaplan ....................... 701/209 |
| 2008/0198043 | A1 * | 8/2008 | Adachi .................. 340/995.12 |

FOREIGN PATENT DOCUMENTS

| DE | 37 00 552 A1 | 1/1987 |
|---|---|---|
| DE | 43 04 838 A1 | 8/1994 |
| DE | 196 04 364 A1 | 8/1997 |
| DE | 199 28 679 A1 | 12/2000 |
| DE | 199 38 267 A1 | 2/2001 |
| EP | 0 921 509 A2 | 6/1999 |
| EP | 1 111 336 A1 | 6/2001 |
| WO | WO 01/01366 A2 | 1/2001 |
| WO | WO 01/11571 A1 | 2/2001 |

* cited by examiner

*Primary Examiner*—Khoi Tran
*Assistant Examiner*—Brian J Broadhead
(74) *Attorney, Agent, or Firm*—Crowell & Moring LLP

(57) ABSTRACT

A sensor arrangement which contains for a vehicle control system, comprises a buffer for geographic information, whereby the geographic information is suitable to describe at least one possible route of the vehicle. An input interface selects subsets of the geographic information stored in the buffer in response to at least one position-related parameter which is entered at the input interface. An output interface selects subsets of the geographic information corresponding to the parameter values provided, which subsets are transmitted for further processing in the vehicle control system.

19 Claims, 3 Drawing Sheets

Prior Art

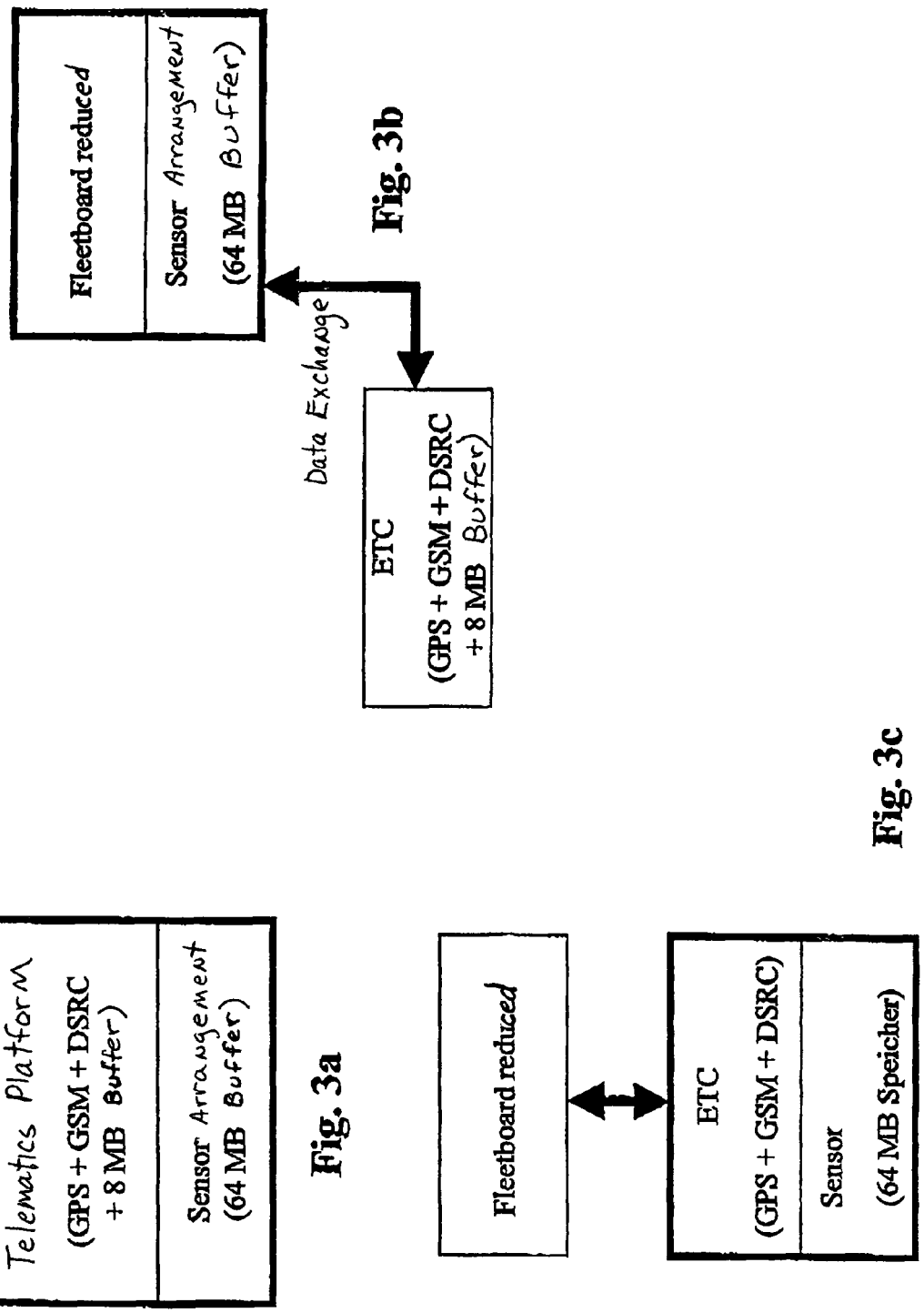

SENSOR DEVICE FOR A MOTOR VEHICLE SYSTEM

BACKGROUND AND SUMMARY OF THE INVENTION

This application claims the priority of German patent document 102 44 329.7, filed Sep. 23, 2002 (PCT International Application No. PCT/EP2003/09721), the disclosure of which is expressly incorporated by reference herein.

This invention relates to a sensor arrangement device for a vehicle control system. A sensor is an electronic component which converts quantifiable values into electric signals, reporting them for additional computer-assisted processing.

Modern vehicles have a variety of sensors, which in some cases are incorporated in the vehicle and support the driver in critical situations, increase driving comfort, or reduce fuel consumption and environmental pollution. A system to increase driving comfort may be a radar-supported, automatic headway control. An example of a method to reduce fuel consumption is a gear change-adapted system, i.e., optimal automatic gear changing for minimal fuel consumption.

While such systems function reliably in normal situations, difficulties may appear under certain circumstances. Thus, with radar-supported automatic headway controls problems may arise in curves or with objects like bridge piers if the radar signal is only available to interpret one object configuration. With the gear change-adapted method only actual values are available, such as an instantaneous turning moment, to derive a moment value for a gradient or an instantaneous steering angle deflection to derive a moment value of the curve. Therefore, a "projection" of future values, and thus an estimate of a future evolution, are not possible.

The availability of geographical information stored in digital road maps represents an opportunity of providing vehicle control systems with additional, more versatile, information. For example, German patent document DE 37 00 552 A1 discloses a vehicle-based navigation system, which includes a digital road map and additional vital information that is used upon reaching the assigned geographical position and/or is to used control systems in the vehicle. By outputting the information and/or controlling the system in the vehicle, automatically collected driving and environmental information, like speed, can be considered.

European patent document EP 1 111 336 A1 describes a procedure for the universal application of a digital roadmap, in which routes are stored in the digital roadmap in the form of edges and nodes to control the vehicle. Beginning at a current location of the vehicle, various possible routes are calculated. In the process an "electronic horizon" is created whose extension is dependent on the type of each route ahead. The geographic information assigned to each route within the electronic horizon is stored in a buffer. The geographic information stored in the digital road map may vary in accuracy for different vehicle control systems, and is correspondingly identified. The information stored in a buffer is supplied to the vehicle control system by a broadcast mechanism (transmission via a vehicle-based network). Each system is configured in such a way that it only receives the information required by the vehicle.

The use of geographic information stored in a digital roadmap, however, entails several disadvantages. On the one hand, digital roadmaps are designed and optimized especially for vehicle navigation. In the present case, navigation is not the main reason for using the digital roadmap; rather, it performs a "storage function" for geographic information which is used to operate vehicle control systems. The digital road map includes much information that is not needed in this field of application. (Reference is made here to FIG. 1.) If only geographic information to operate the vehicle control systems is called for, unnecessarily expensive storage space is used, which in turn requires the installation of expensive devices in the vehicle for such an amount of data, e.g., a CD ROM or DVD player. The information actually required could be stored in an economical memory chip instead. In addition, an expensive, vehicle-based navigation system must be incorporated to operate the digital roadmap, even in cases where such navigation system is actually not needed, e.g., if the vehicle uses a centrally-based navigation system.

In addition, as shown in European patent document EP 1 111 336 A1, for instance, extensive and complicated configuration, and transmission and reception operations are necessary to make the geographic information available to the vehicle control systems. The reason is the "universal" use the same digital roadmap for different vehicle control systems. On the one hand, this increases both the volume of data traffic in the vehicle's internal network (e.g., the CAN—"Controlled Area Network"), and the complexity of the corresponding system structure. On the other hand, it is also faultprone, not allowing for a separation between comfort functions and safety critical functions, so that the geographic information provided turns out to be unreliable for use in vehicle control systems.

One object of the present invention, therefore, is to provide a vehicle control system with required geographic information in an easy, economic and stable manner.

This and other objects and advantages are achieved by the sensor arrangement according to the invention, in which a storage buffer is provided for geographic information that is suitable for describing one or more vehicle routes. An input interface is provided for selecting a subset of the geographic information stored in the buffer, such selection being activated by providing at least one parameter value at the input interface. An output interface outputs the subsets of geographic information corresponding to provided parameter values, and the latter are sent for further processing in the vehicle. In other words, neither a digital roadmap nor a "navigable" (suitable for vehicle navigation) data set is required. Not even a navigation system to control the digital roadmap is required.

According to this invention only a geographic information buffer cache is provided. The buffer stores geographic information suitable to describe at least one possible route, which wholly or partially corresponds to a route from a starting to an arrival point. This procedure offers several advantages: For the first time, a complete separation between geographic information provided for use in vehicle control systems and geographic information used for navigation has been implemented. This is an important advantage in safety critical vehicles, for instance.

In a further embodiment of the invention, the geographic information used by safety critical vehicle control system can be certified, (i.e., it is specially checked by state agencies or other trustworthy institutions). In contrast, commercially available digital roadmap is not certified, nor could it possibly be, due to the huge amount of data it contains. A mixture of certified and uncertified information, which would be questionable from the safety point of view, is effectively prevented by the invention-related isolated buffer cache for certified geographic information used by safety critical vehicle control systems.

A further advantage of the separation between the geographic information intended for use in vehicle control systems and the geographic information used for navigation, is the independence which it gives the vehicle manufacturer from navigation systems producers. Navigations systems, as electronic consumer goods, are subject to a quick production cycle and constant advancements. Thus, with every new generation of navigation systems used in vehicles, new adaptations are required, (e.g., of the interfaces and of checks and functional tests, especially with safety critical vehicle control systems). Such advancements in navigation systems, however, involve only the navigation function, as the provision of geographic information for vehicle control systems is all but a "secondary task" of a navigation system. The input and output interfaces of the invention-related sensor device, which constantly remain the same, represent significant cost and labor savings.

Another advantage of the invention in particular consists of its use in commercial vehicles, which usually drive along only one or a few routes, so that a comprehensive digital roadmap is unnecessary. In addition, commercial vehicles usually do not use a vehicle-based navigation system, since the drivers generally know the few routes to be driven along very well, and centrally based navigation and management systems are frequently used, e.g., "Fleetboard"™ by the DaimlerChrysler Company. Due to the cost pressure in the transport business, vehicle-based navigation systems have had to be dispensed with, and no geographic information could be used in the vehicle control system. This invention remedies that problem.

Commercial vehicles in particular usually have other control devices. For example, in addition to the centrally based navigation and management system already in use, in the near future it will be compulsory to outfit heavy commercial vehicles with a device to calculate the road impact fee, which will require a calculator and additional sensors incorporated in the invention-related buffer. The sensors are especially for positioning, e.g., with GPS ("Global Positioning System"), and additional sensors are used for monitoring and correcting of positioning errors, (e.g., in an odometer or an electronic gyroscope). Furthermore, devices to communicate with external units are provided by means of GSM ("Global System for Mobile Communications") or DSRC ("Dedicated Short Range Communication" short range communications), for instance. Actually, positioning itself is carried out through these devices.

In a further embodiment these devices are advantageously assembled in a single packaged circuit. Thus, at least some of the additional sensors, the calculator and the invention-related sensor device form a compact, standardized and therefore low cost telematics platform. In addition to the invention-related sensor device the platform comprises the in-vehicle component of a centrally based navigation and management system and/or the road impact fee calculator.

According to this invention, one or more position-related parameter values are provided at the input interface of the buffer to select a subset of the stored geographic information. Further advantageous advancements allow for other parameter combinations in addition to the current position of the vehicle. In particular these are partial sections of the current route or geographic area, provided by a centrally based navigation system. A geographic area is formed by a "funnel" opening around the current vehicle position, whose size depends on the vehicle speed and whose opening angle depends on the vehicle direction. Here a variety of possibilities exists depending, in particular, on the type of the vehicle control system. The connection of the input or output interface of the buffer to the vehicle-based data network (e.g., CAN—"Controlled Area Network") is thereby advantageous. This way, an especially easy transmission of the required additional sensor values and/or geographic information is possible.

Alternatively, an additional calculator (e.g., a vehicle computer or control device) can be provided in the vehicle to control the invention-related sensor arrangement, so that the sensor arrangement has its own calculator to determine the position-related parameter values, The incorporated calculator can directly process additional sensor data, and thus determine the position independently. In another embodiment the incorporated calculator selects the next partial section of a route determined by a centrally based navigation system. Here a variety of embodiments is possible. Naturally the calculator and the sensor device can be designed as a single structural unit. In addition, a sensor device can be assigned to each vehicle control system. Alternatively one sensor device can be used by several vehicle control systems. In the process one or more incorporated calculators can again be provided. Any such combinations are thereby possible.

Advantageously, the invention-related sensor arrangement is designed as an "intelligent" sensor, especially easy use based on the "plug & play" (self-configuration without additional adaptation) principle.

According to the invention, the geographic information stored in the buffer is not all-purpose information for navigation, for the vehicle control systems operations or for other purposes; rather it is provided especially for the operation of one or more vehicle control systems, instead. Thereby a significant reduction of the extent of the required data results, as there is no need for the data to be suitable for navigation.

In an especially advantageous embodiment, the storage format used for the geographic information stored in the buffer is a type which requires very little storage space and, in particular, is highly accurate. Since it is not suited for navigation, such a data format has not been used previously for storage of geographic information in a vehicle. This innovative data format basically turns away from the usual reproduction of sections of a digital roadmap using edges and nodes. Especially for nonlinear route sections, like curves, the latter type of reproduction is inaccurate and requires a great deal of storage space, because curves usually have the form of circular arcs or the form of a clothoid (Cornu spiral). Clothoids, or even curves whose curvature increases proportionally with the arc length, are used as a transition between circular arcs and straight sections or between two circular arcs. By means of a parameter-based description of non-straight route sections as a circular arc or a clothoid or a spline, enormous storage space is saved, since only the corresponding parameters need be stored. At the same time, the accuracy of the geographic information is significantly increased, since no fault-prone "approximate solution" in the form of an approximation with edges and nodes is stored. Instead the exact reproduction is stored in the buffer. In addition, the access to the geographic information is accelerated and the assigned processing unit is relieved of calculating tasks.

According to the invention, only one or a few routes for the vehicle will be stored in the buffer. As already shown, this arrangement is especially advantageous in commercial vehicles. But from time to time it is necessary to provide new geographic information, not stored in the buffer theretofore, for example when completely new sections or routes are to be provided to the vehicle control systems. The same is also true when changes have been made to the stored routes and due to road works or construction. These changes are made in an especially easy way, if the buffer can be overwritten. It is advantageous, if the geographic information is partially or incrementally or completely changeable and the various changes can be easily made. Naturally, these possibilities are based on the calculation code stored in the incorporated calculator potentially associated with the sensor device.

In another especially advantageous embodiment the buffer is designed as a flash ROM. Changes can thus be made comfortably without the risk of erroneously deleting the geographic information. The change is made by means of a data line connected to the buffer, which is accessible via an appropriate interface. In a further embodiment the buffer is designed as a mobile ram which is easily inserted by the vehicle driver into a bracket and so made accessible to EDP.

Because certified geographic information is relatively expensive to produce and to acquire, the use of large amounts of data, (e.g., a digital roadmap), is hardly promising. On the other hand, such a mechanism is ideally supported by an overwritable buffer, as only one or a few routes are stored. It thus involves only moderate costs to keep up with the state of the art. This way, a reliable vehicle control system furnished with geographic information is always guaranteed.

The vehicles furnished with geographic information by the invention-related sensor are basically best operated on highways. In built-up areas, the traffic flow is basically influenced by the vehicles dynamics due to traffic lights and intersections and thus a reasonable use of the of the system in the vehicle is impeded. Therefore only countryside-related geographic information is advantageously stored in the buffer.

Numerous vehicle control systems benefit from being furnished with geographic information systems. On the one hand, the functions of already existing systems (for example radar-supported, automatic headway control) are further improved and can still be more versatile. In the process of evaluating an object configuration, further information, in addition to the radar signal, is provided by the detection of an object ahead using the geographic information. This considerably increases the certainty of detection in difficult situations such as, for example, in curves or with bridge piers. With gear change-adaptation, the geographic information is now available in addition to the current values, as an anticipation of future values (for example, an instantaneous turning moment to derive a moment value for the gradient, or an instantaneous steering angle deflection to derive a moment value of the curve). Thus vehicle situations can be better estimated. For example, it is now possible to check, whether a gradient limit value was exceeded for a short time or whether a longer gradient section actually lies ahead.

On the other hand, supplying the invention-related sensor device with geographic information facilitates the design of totally innovative systems. A particular highlight here is an anticipated curve warning. Especially with commercial vehicles tip-over accidents with severe consequences repeatedly occur even with experienced drivers on frequently traveled routes. The invention-related sensor arrangement is ideally suited to significantly reduce the number of such accidents. Further examples of innovative vehicle control systems are a curve light, (i.e., a forward looking deflection of the headlights depending on the road curve), a warning of upcoming locations where the vehicle cannot pass, like bridges or narrow spots, a situation-adapted warning and information management, so as not to overload the driver with stimuli, and a predicative diagnosis with actual, local load complexes acting on a component.

Other objects advantages and novel features of the present invention will become apparent from the following detailed description of the invention when considered in conjunction with the accompanying drawings.

BRIEF DESCRIPTION OF THE DRAWINGS

FIG. 3a) to c) show each preferred embodiments of the invention.

In FIG. 1 the storage requirements for individual types of data with a commercial digital roadmap are shown as a pie chart. Especially depicted here is the storage requirement of a digital roadmap in the form of a CD-ROM for Germany by the NavTech Company. In the following section various types of data stored according to the state of the art will be explained briefly.

Addresses, e.g., street names and house numbers, are the geographic information used as the starting and arrival points in navigation. Restrictions relate to unauthorized crossing at intersections, (e.g., turning prohibitions). Attributes are associated data providing additional information, for example, number of lanes on a road, while geometry relates to the geographic representation of the distance with edges and nodes. Topology, on the other hand, is the logical interconnection of distances and nodes. Polygons relate to information to be visualized during navigation, e.g. the boundaries of woodland or cities; and POI relates to points of interest which can be used as starting, arrival or intermediate points during navigation, landmarks, for instance. It can be clearly seen in FIG. 1, that simply by omitting information such as "addresses" and "polygons", that is needed only for navigation and not for the operation of vehicle control systems, forty-two percent less storage space is required.

Figure 1:
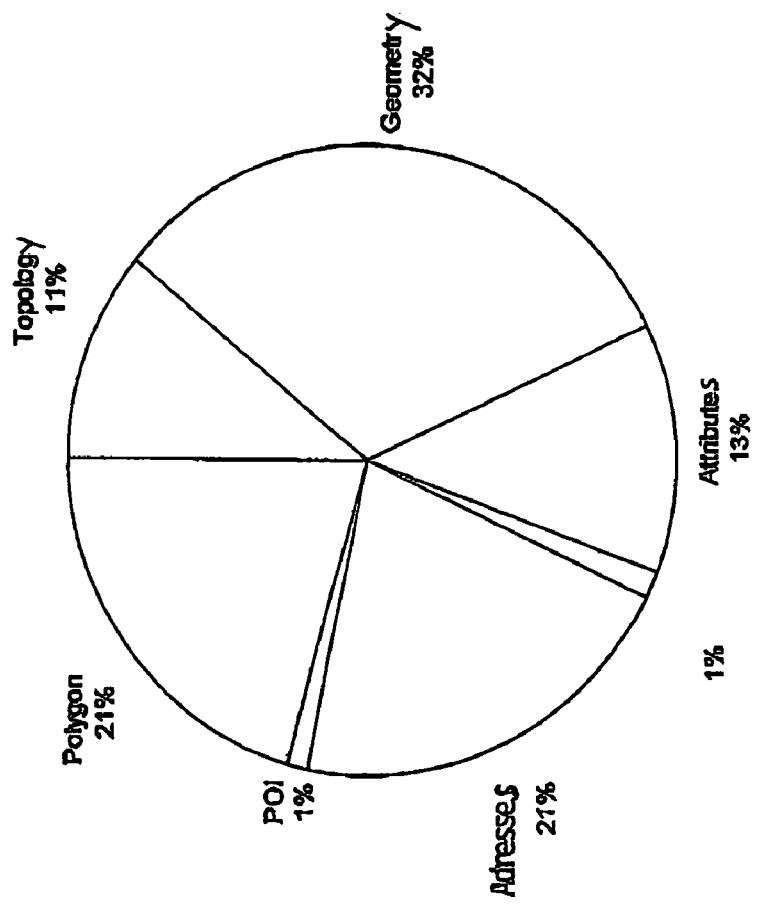
FIG. 1 is a graph which illustrates requirements for individual types of information with a commercial digital roadmap.
Figure 2B:
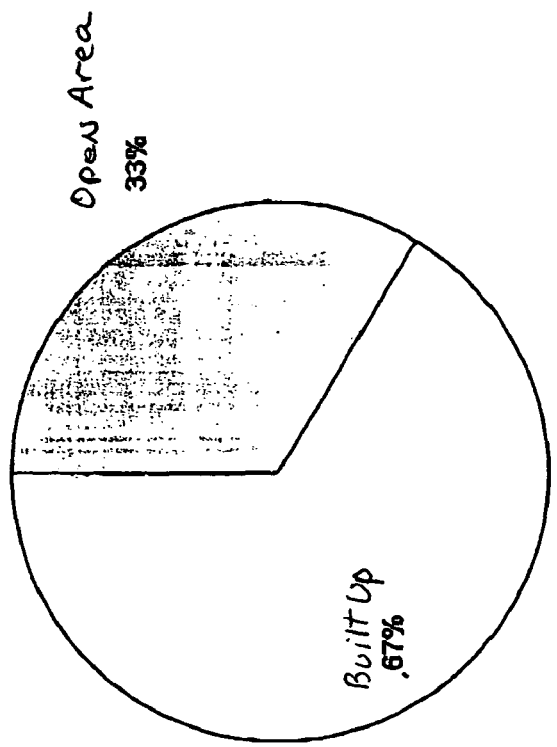
FIG. 2a) and b) are graphs which illustrate requirements for individual types of areas with a commercial digital roadmap.
Figure 2A:
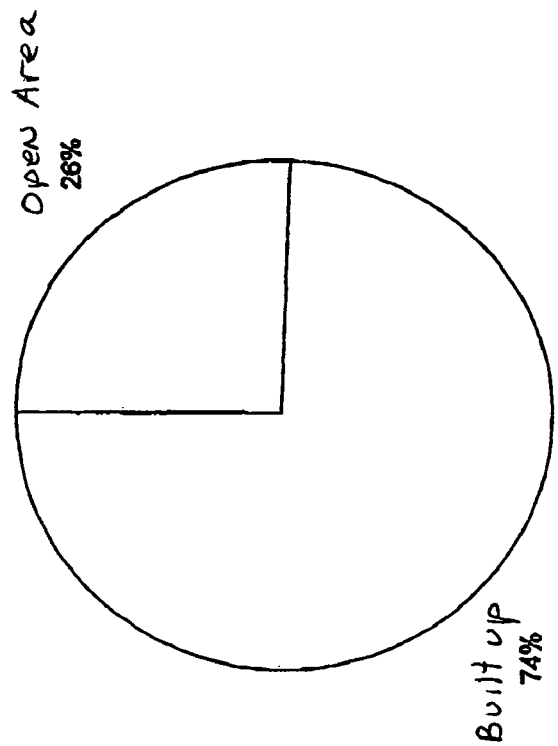

In FIGS. 2 a) and b) the storage requirement is shown for individual areas for the same commercial digital roadmap as depicted in the pie chart of FIG. 1. In the process "open spaces" (i.e., outside urban and village areas), are differentiated from "built-up areas", FIG. 2 a) thereby shows the number of edges allotted to each area, while FIG. 2b) shows the number of nodes allotted to each area. From this figure it can be seen that by omitting geographic information about "built-up areas" (areas not suitable for a useful operation of most vehicle control systems), between sixty-seven and seventy-four percent less storage space is required.

FIGS. 3 a) to c) in schematically depict preferred embodiments of the invention. FIG. 3 a) shows a telematics platform, which comprises various devices and calculators in a single packaged circuit. Such devices and calculators include additional positioning sensor (GPS), the invention-related sensor arrangement including a 64 MB buffer, an additional 8 MB buffer for intermediate storage of calculations, a device for the communication between the vehicle and external units (GSM), and also for short range communications, (DSRC). This telematics platform is very versatile. Actually, positioning of the vehicle is carried out by this device. With it the vehicle includes the telematics platform of a centrally based navigation and management system as well as a road impact fee calculator. According to this invention it additionally, provides geographic information to the vehicle.

In FIG. 3 b) the invention-related sensor arrangement comprising a 64 MB buffer and the in-vehicle component of the centrally based navigation and management system are combined into a single unit, "Fleetboard Reduced™". This unit includes the in-vehicle component of the centrally based navigation and management system and is able to perform its own calculations. However, it does not include any additional sensors, e.g. positioning sensors. These additional sensors are included in a separate unit to calculate road impact fees. The ETC unit comprises, in addition to its own calculator, an additional positioning sensor, GPS, an additional 8 MB buffer for the interim calculation storage, the communication appliance between the vehicle and external units, GSM, and also the appliance for short range communications DSRC. Apart from its main function, the independent calculation of road impact fees, the ETC unit by means of an information exchange provides information from the additional sensors to the "Fleetboard Reduced™" unit as a "by-product". According to the invention, The "Fleetboard Reduced™" unit provides vehicle control systems with geographic information.

In FIG. 3 c), the invention-related sensor arrangement comprising a 64 MB buffer and a road impact fees calculator are combined into a single ETC unit. Therefore, in addition to the invention-related sensor device and the built-in road impact fees calculator, the ETC unit includes a positioning sensor, (GPS), an additional 8 MB buffer for the interim calculations storage of the communication appliance between the vehicle and external units (QSM), and also the device for short range communications, DSRC. The main function of the ETC unit is to calculate road impact fees. For this purpose, it exchanges information with the "Fleetboard Reduced"™ unit. For example, the ETC unit receives a route provided by the centrally based navigation system via the "Fleetboard Reduced"™ unit. Here the ETC unit provides the system in the vehicle with the information-related geographic information.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Sensor arrangement for a vehicle control system, said sensor arrangement, comprising:
    a buffer for geographic vehicle operation information;
    an input interface for selecting a subset of the geographic vehicle operation information stored in the buffer, in response to at least one position-related parameter value entered at the input interface; and
    an output interface for outputting the subset of the geographic vehicle operation information corresponding to the at least one parameter value, whereby the output information is sent for further processing in the vehicle control system; wherein,
    said geographic vehicle operation information consists of geographic information that is limited to controlling operation of said at least one vehicle control system as the vehicle traverses at least one possible route;
    said buffer is an isolated buffer cache having only said limited geographic information stored therein; and
    said limited geographic information consists of a non-navigable subset of a vehicle navigation information included in a digital road map, and excludes address and polygon data that are needed for navigation, as well as all information regarding built up areas.

2. The sensor arrangement according to of claim 1, wherein the buffer is overwritable.

3. The sensor arrangement according to claim 2, wherein the buffer comprises a flash ROM.

4. The sensor arrangement according to claim 3, wherein at least one of the input and output interfaces is connected to a vehicle-based information network.

5. The sensor arrangement according to claim 4, wherein the geographic vehicle operation information is at least partially or incrementally changeable.

6. The sensor arrangement according to claim 5, wherein change of the geographic vehicle operation information is performed by means of a data transmission line connected to the buffer.

7. The sensor arrangement according to claim 6, wherein one of a geographic position of the vehicle, a geographic area based thereon, and a route section based thereon, is entered as a parameter value at the input interface.

8. The sensor arrangement according to claim 7, further comprising an EDP connection with a vehicle-based telematics platform.

9. The sensor arrangement according to claim 8, further comprising an EDP connection with a vehicle-based road impact fees calculator.

10. The sensor arrangement according to claim 9, further comprising an EDP connection with a navigation system.

11. The sensor arrangement according to claim 10, wherein the navigation system is centrally based.

12. The sensor arrangement according to claim 1, wherein a non straight parameter-based, partial section of a route is described in said geographic data as one of a circular arc, a clothoid and a spline.

13. The sensor arrangement according to claim 1, wherein the geographic vehicle operation information describes at least one route of the vehicle.

14. The sensor arrangement according to claim 13, wherein the vehicle is a commercial vehicle.

15. The sensor arrangement according to claim 1, wherein the sensor arrangement comprises an intelligent sensor.

16. The sensor arrangement according to claim 1, wherein nonlinear route sections are defined in said geographic vehicle operation information by a parameter based description of said nonlinear route sections as one of a circular arc, a clothoid and a spline.

17. The sensor arrangement according to claim 16, wherein at least one of clothoids and curves whose curvature increases proportionally with arc length are used as transitions between circular arcs and straight sections.

18. The sensor arrangement according to claim 1, wherein said buffer is formed on a memory chip.

19. A vehicle control arrangement, comprising:
    at least one vehicle control system for controlling operation of said vehicle;
    a buffer for geographic vehicle operation information;
    an input interface for selecting a subset of the geographic vehicle operation information stored in the buffer, in response to at least one position-related parameter entered at the input interface; and
    an output interface for outputting the subset of the geographic vehicle operation information corresponding to the at least one parameter value, whereby the output information is sent for further processing in said at least one vehicle control system; wherein,
    said geographic vehicle operation information consists of certified geographic information that is limited to controlling operation of said at least one vehicle control system as the vehicle traverses at least one possible route;
    said buffer is an isolated buffer cache in the form of a memory chip, having only said vehicle operation information stored therein; and
    said geographic vehicle operation information consists of a non-navigable subset of vehicle navigation digital road map information; and
    said geographic vehicle operation information includes only information regarding areas that are not built up, and excludes i) address and polygon data that are needed for navigation, and ii) information regarding built up areas.

* * * * *